United States Patent [19]

Sherman

[11] 4,388,620
[45] Jun. 14, 1983

[54] METHOD AND APPARATUS FOR GENERATING ELLIPTICAL IMAGES ON A RASTER-TYPE VIDEO DISPLAY

[75] Inventor: David L. Sherman, Sunnyvale, Calif.

[73] Assignee: Atari, Inc., Sunnyvale, Calif.

[21] Appl. No.: 222,480

[22] Filed: Jan. 5, 1981

[51] Int. Cl.³ .............................................. G06F 3/14
[52] U.S. Cl. .................................. 340/744; 340/724; 340/731; 364/521
[58] Field of Search ............... 340/720, 723, 724, 727, 340/731, 734, 743, 744, 747; 364/515, 521; 358/280

[56] References Cited

U.S. PATENT DOCUMENTS 3,491,200 1/1970 Wisnieff ............................. 340/744
4,107,662 8/1978 Endo et al. .......................... 340/731
4,257,044 3/1981 Fukuoka ............................. 340/744

Primary Examiner—Alvin H. Waring
Attorney, Agent, or Firm—Townsend and Townsend

[57] ABSTRACT

A method and apparatus provides for the generation of a number of elliptical images on a raster scan video display screen by storing information indicative of a predetermined model image, and for each elliptical image to be displayed, storing data indicative of the vertical and horizontal eccentricity of each image, and its display location. During display time, the vertical eccentricity, horizontal eccentricity, and display location binary information for each elliptical is accessed and used to sequentially read selected portions of the model image information to produce therefrom address signals indicative of the location of individual horizontal display elements that make up the desired elliptical image. The address signals are applied to a random access memory to store marker information indicative of the elliptical image at memory locations corresponding to the position on the display screen that the image will take. The random access memory is sequentially scanned in synchronism with the scan of the electron beam used to form the raster, converted to video information and displayed.

12 Claims, 12 Drawing Figures

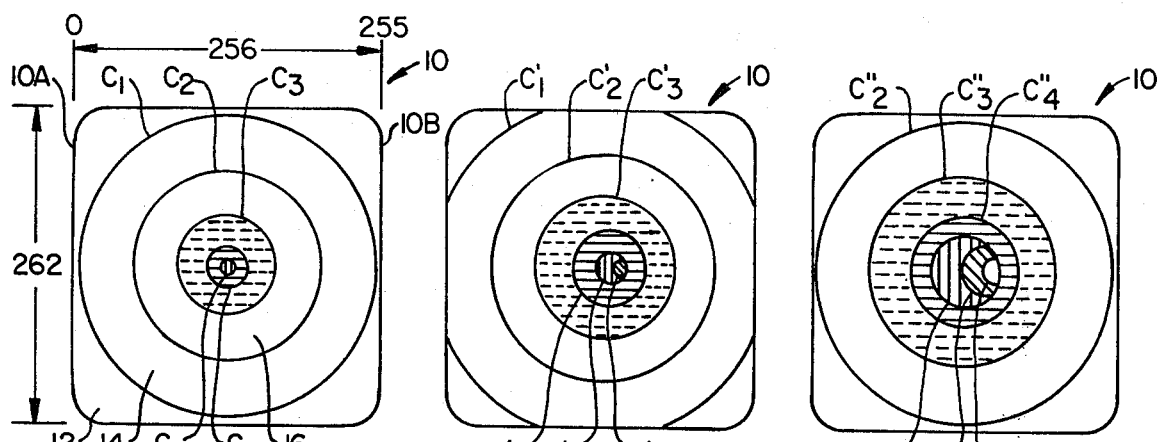
FIG._1A.  FIG._1B.  FIG._1C.
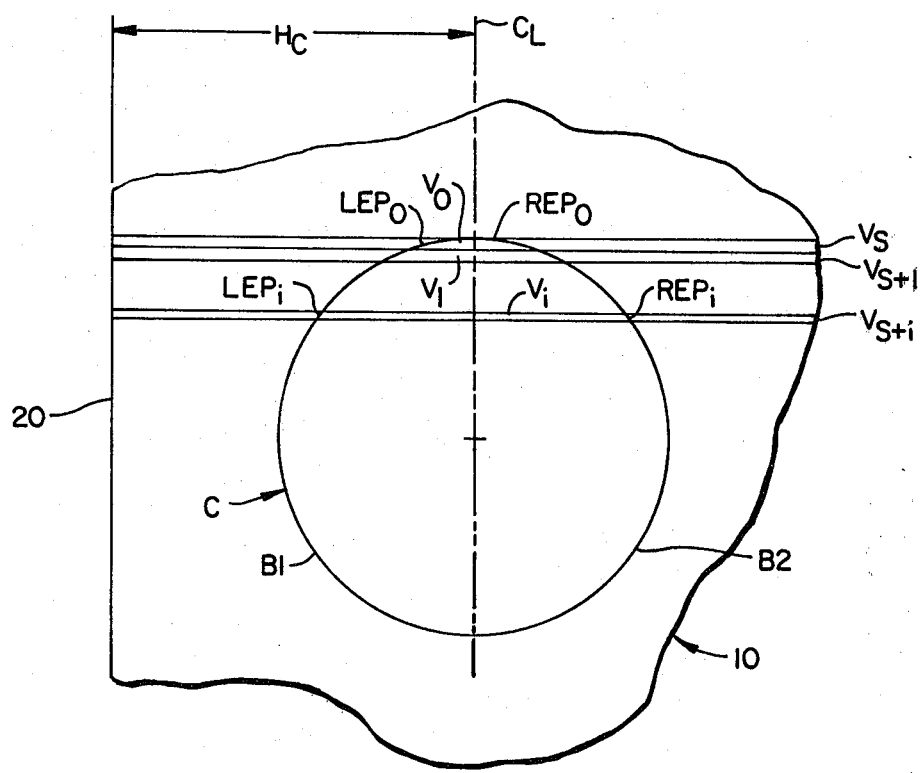
FIG._2A.
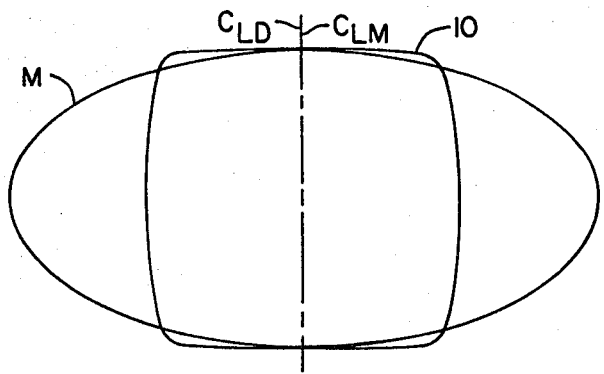
FIG._2B.

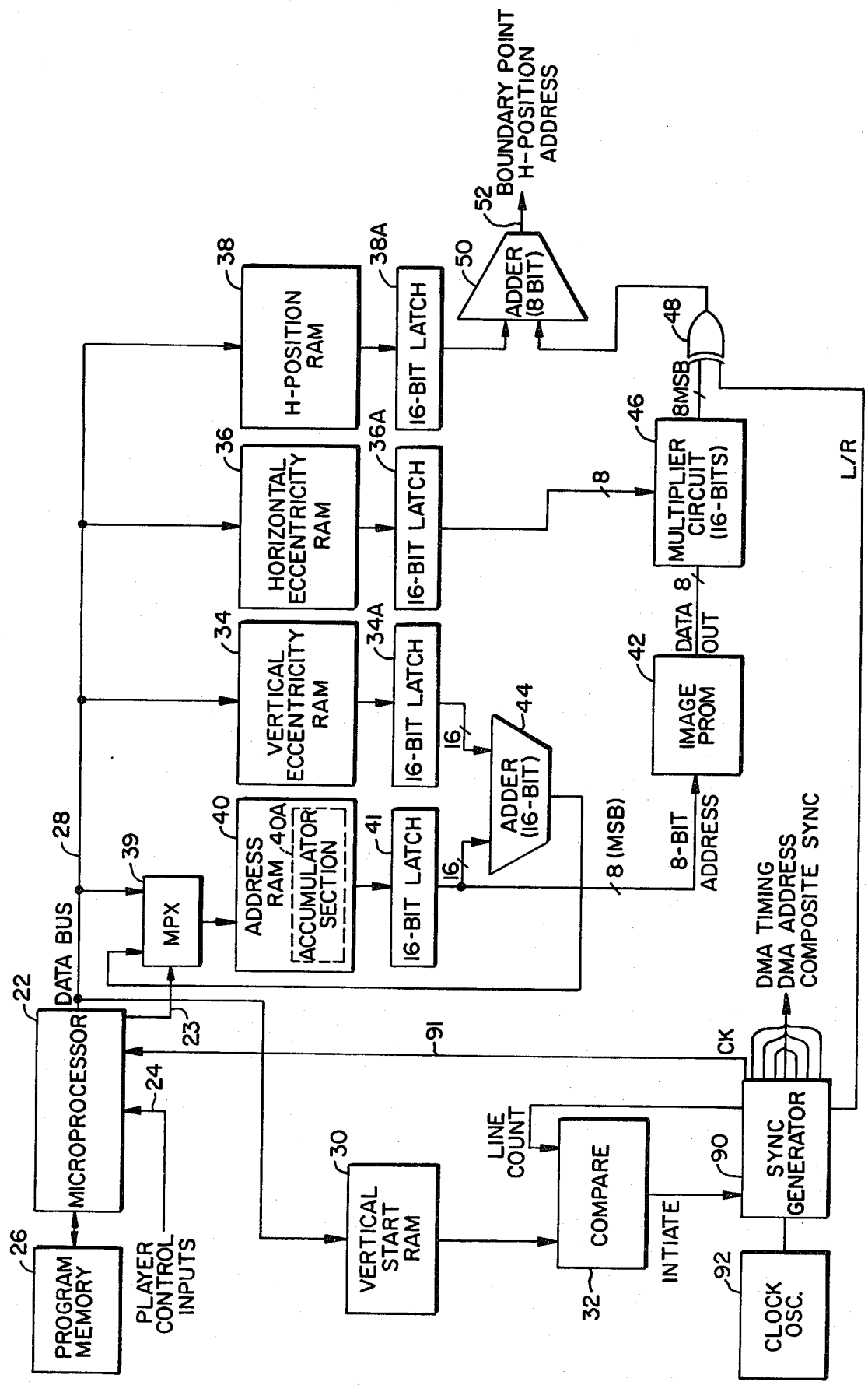
FIG._3A.

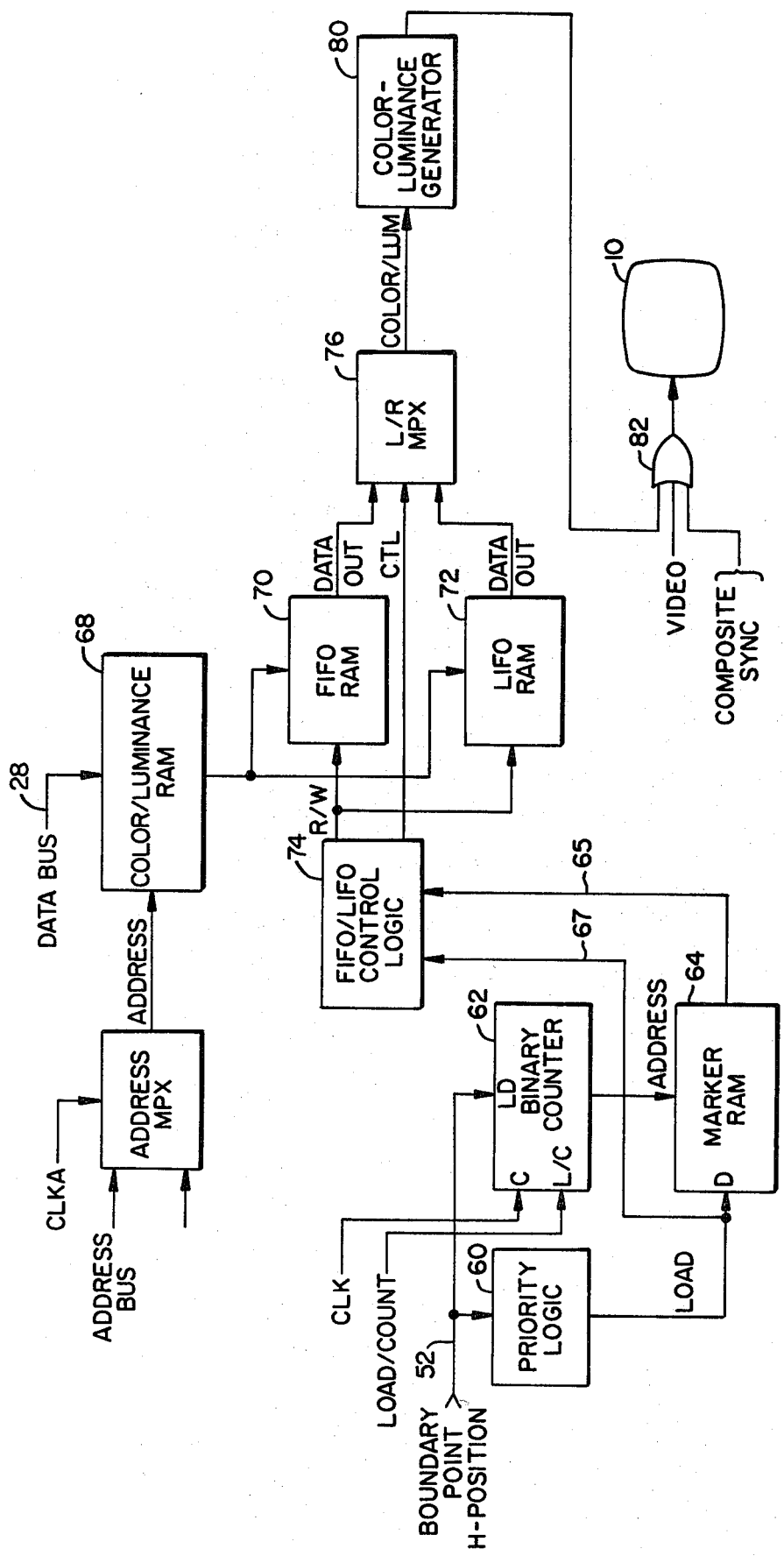
FIG._3B.

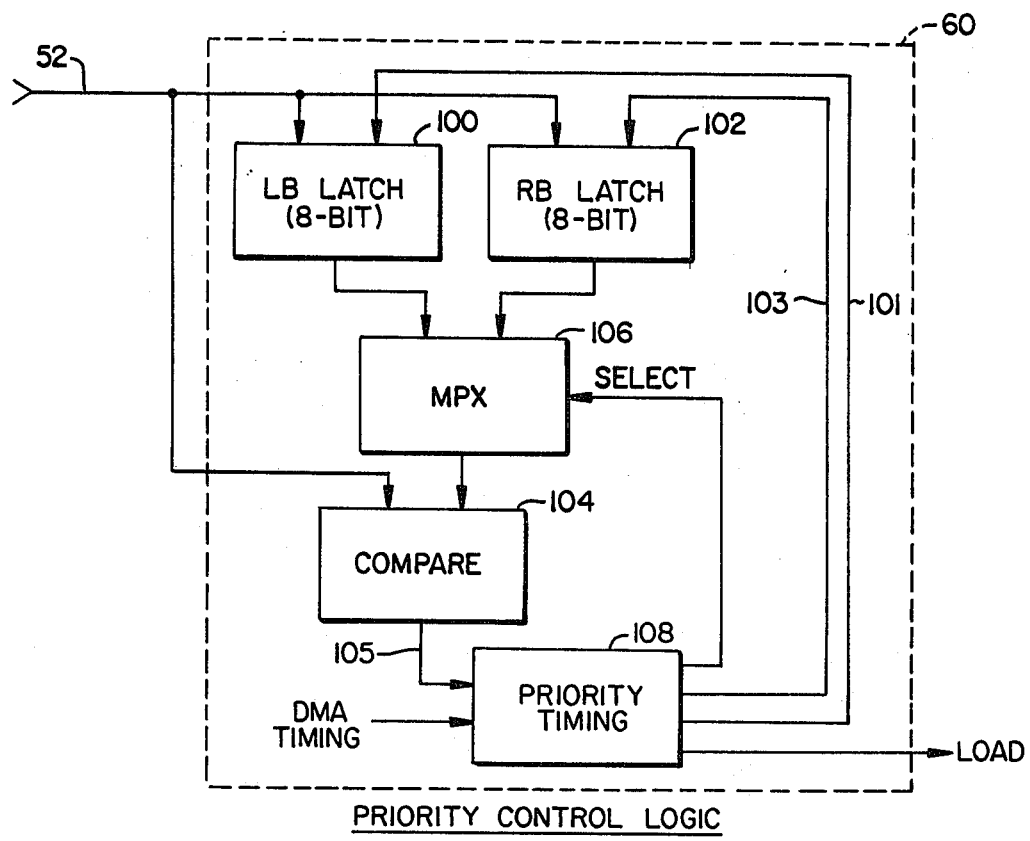
FIG._4.
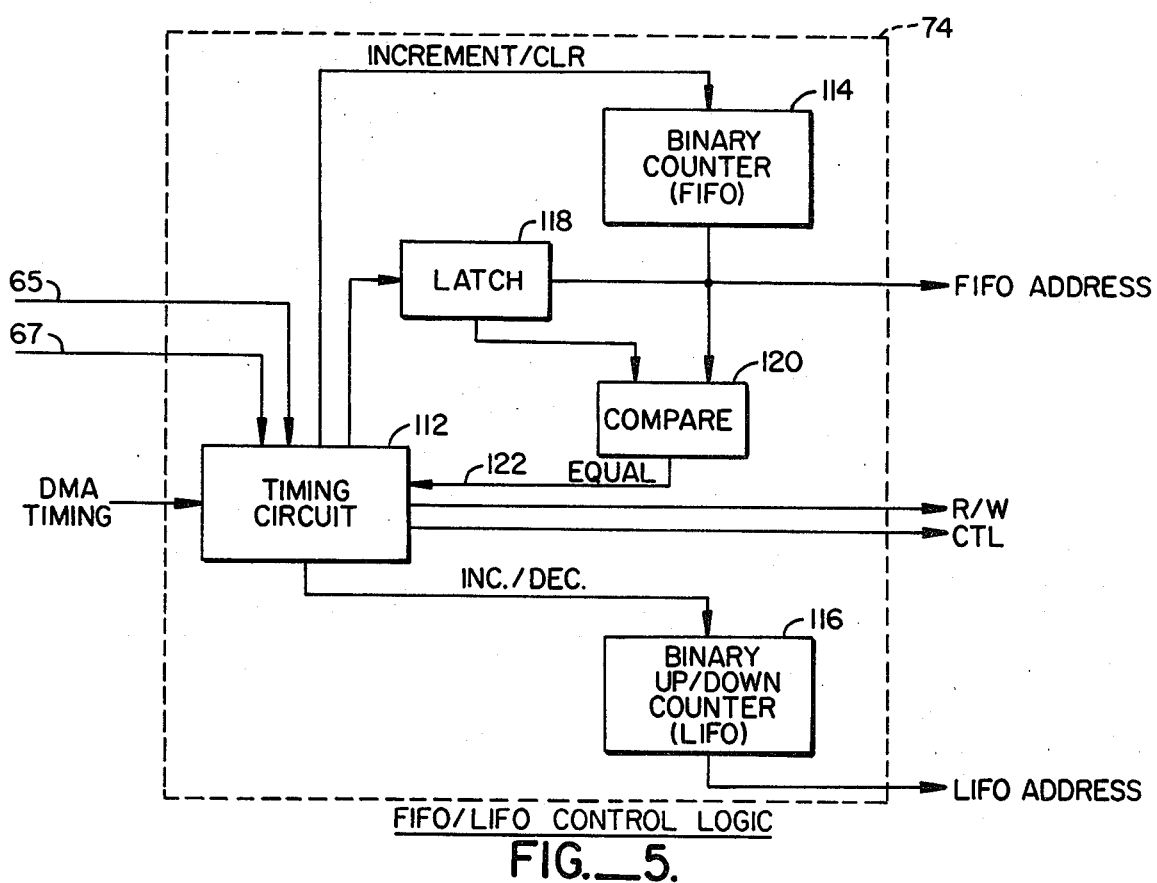
FIG._5.

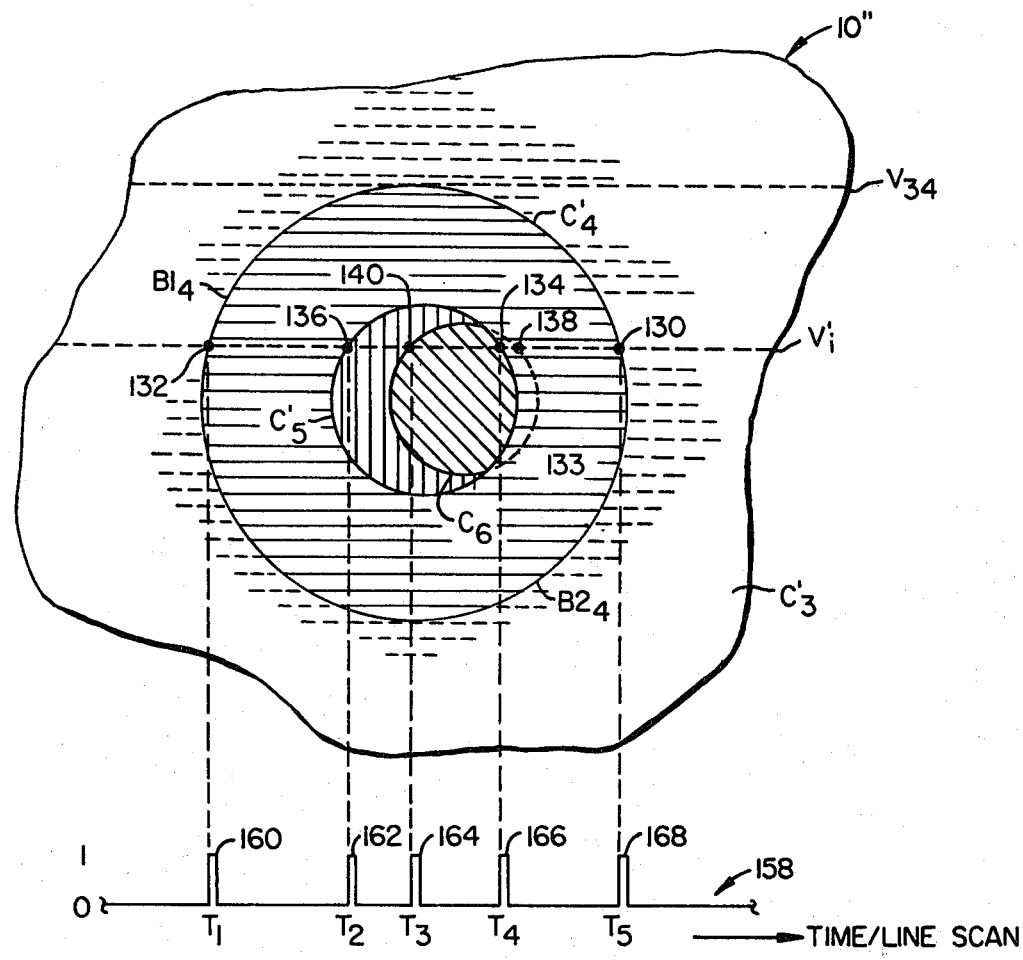
FIG._6.
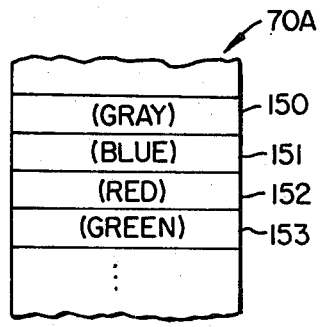
FIG._7A.
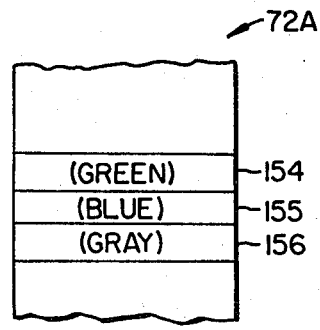
FIG._7B.

METHOD AND APPARATUS FOR GENERATING ELLIPTICAL IMAGES ON A RASTER-TYPE VIDEO DISPLAY

The present invention pertains generally to the display of elliptically shaped areas on a raster scan display screen and more particularly to a method and apparatus for displaying a plurality of elliptically shaped objects that are variable in position, size and shape (i.e., eccentricity).

In certain video games it has been found desirable to produce and display curved, circular or elliptically shaped objects that vary in size and position. For example, various curved objects (i.e. ellipses) can be used to simulate asteroids, planets and other heavenly objects whose change in size and position can simulate a sense of perspective and afford a video game a greater semblance of reality.

Heretofore, it has been the practice to store a binary representation of the object in a memory. The binary information can then been read from the memory in synchronism with the active scan of the display beam to produce the object for display. For simpler shapes, the size of the object can vary by varying the rate at which the information is read from the memory, thereby "stretching" the information and its appearance on the display. An example of this technique can be found in U.S. Pat. No. 4,107,665.

However, as the shape of the object becomes more complex, or if the shape and size are to vary, other techniques must be used. One such technique is to store binary representations of all possible sizes and shapes of the object to be displayed. This practice, however, has a number of limiting factors: the memory space required to store the binary representations can become exorbitant and, as a requirement for memory space increases, the circuitry required to handle the binary information also increases—at times faster than the memory space. Further, handling the binary information can be relatively slow, leading to severe timing problems when there are a number of objects to be displayed.

SUMMARY OF THE INVENTION

The method and apparatus of the present invention provides for the generation of elliptical areas or images on a raster scan video display by storing picture information of a model image. For each elliptical image to be displayed, the picture information is read from the memory and modified in accordance with binary information describing the vertical and horizontal eccentricity of the elliptical image desired and its display location to produce address signals that are indicative of the location of individual horizontal display elements that make up the elliptical image. The address signals are applied to a random access memory (RAM) to store markers indicative of the elliptical image at memory locations corresponding to the position on the display screen that the image will take. The RAM is then scanned in syncronism with the scan of the image forming beam of the display and the accessed markers converted to video that is communicated to the display for viewing.

The picture information of the model image is in the form of data word pairs, each pair indicative of a horizontal element of the model by describing the location of the left and right end or boundary points of the element relative to the vertical center line of the model—which is coincident with that of the display.

Vertical eccentricity is varied by accessing only selected horizontal elements, using some and bypassing others, to reduce the vertical eccentricity of the model; or, alternatively, using the horizontal elements redundantly to vertically increase the model's eccentricity. Horizontal eccentricity is modified by multiplying each data word pair by an appropriately selected scale factor, increasing or lengthening the length of the corresponding horizontal element. Thus, using the picture information of the model, circles can be made larger or smaller by simultaneously varying both the vertical and horizontal eccentricities by an appropriate amount. Alternatively, the shape can be modified by varying the horizontal eccentricity, vertical eccentricity, or both by amounts that create an ellipse.

In the preferred embodiment of the invention, circular images are produced. The picture information of the model image is stored in a programmable read-only-memory (PROM). A microprocessor, in response to varying input data, supplies information that specifies the horizontal and vertical location of where the generated circular image is to appear on the display, and information describing the horizontal and vertical eccentricities (i.e., size) of the image. An accumulator is provided whereon is stored the address of the memory location of the PROM containing the first of the data words describing the circular model. During the horizontal retrace interval, a check is made to determine if a circular area is to be displayed during the upcoming horizontal line scan. If so, the address is obtained from the accumulator and used to address the PROM and obtain therefrom the information describing the end points of the first horizontal element. The address so used is combined with the vertical eccentricity data to form the address of the next set of end points for the next horizontal element to be displayed in the next horizontal line scan and returned to the accumulator. The value of the vertical eccentricity information, therefore, determines the rate at which the PROM is accessed each horizontal scan line. Thereby the vertical eccentricity of the image to be displayed can be changed by skipping memory locations or addressing the same memory location more than once.

Each end point data word access from the PROM is scaled by multiplying it with the horizontal eccentricity information. The scaled quantity is then combined with information describing the horizontal location on the display of the circular image to obtain the horizontal location at which each end point will appear on the video display screen. This location information is used to address the RAM to store a one bit marker at locations in the RAM corresponding to the horizontal location on the display at which each end point of the circle's horizontal element lies.

During each horizontal active line scan, the marker bits are sequentially accessed from the RAM in synchronism with the scanning beam. As each marker bit is encountered, video information is formulated describing each horizontal component of the image and communicated to the display.

In a further embodiment of the invention, there is provided color and/or luminance changes to differentiate one circular area from another when a plurality of such circular images, sometimes overlapping, are displayed. To this end, color information describing the color of each circular image to be displayed is stored in a color memory. As the active horizontal line is generated, the RAM containing the marker bits is read in synchronism with the scan as described. As each stored marker bit is encountered, the color/luminance information associated with the circular image (and corresponding to the marker bit) is accessed from the color memory and used to cause the circular image to be displayed in a predetermined color/luminance.

It should be evident at this point, that there are a number of advantages obtained by the method and apparatus of the present invention. For example, the capability of generating a large variety of elliptical areas on a raster scan type display is provided, each elliptical area capable of being distinguished from other elliptical areas by color, luminance, vertical eccentricity, horizontal eccentricity, or a combination of any of these qualities.

Further, by providing a method and apparatus that accepts a minimum of information describing each elliptical area to be generated, the necessary memory space is reduced as is circuitry required to accompany such memory. Additionally, this last mentioned feature allows the user to modify the size and shape of an elliptical area with a minimum of programming effort and complexity merely by redefining each object by its vertical and/or horizontal eccentricity.

BRIEF DESCRIPTION OF THE DRAWINGS

For a more thorough understanding of the nature of the present invention, and how it may be best practiced by those skilled in the art, reference is made to the following detailed description and the appended figures in which:

FIGS. 1A-1C are illustrative views of a raster scan video display screen with generally circularly shaped elliptical images formed thereon in accordance with the present invention and illustrating, in sequential fashion, use of the images to simulate travel down a generally cylindrical tube;

FIG. 2A is an illustrative view of a generally circular image generated in accordance with the present invention;

FIG. 2B is a representation of a model image used in the practice of the present invention to generate circular images;

FIGS. 3A and 3B combine to form a block diagram of the circuit used to embody the present invention; and FIG. 4 illustrates in greater detail the priority logic control used in the circuit of FIG. 3B;

FIG. 5 illustrates in greater detail the FIFO/LIFO control logic used in the circuit of FIG. 3B;

FIG. 6 is an illustrative view of three circular images generated in accordance with the teachings of the present invention, showing differentiation by color; and FIGS. 7A and 7B illustrate the ordering of the color and luminance information in the FIFO and LIFO RAMs in order to produce the images illustrated in FIG. 6.

DETAILED DESCRIPTION OF THE INVENTION

The present invention is utilized in a video game which involves pursuit of an "enemy" space craft down a generally cylindrical-like tube. A player manipulates controls (not shown) while viewing a video display screen on which can be viewed an object in the shape of the enemy space ship being pursued. The tube, and travel therethrough, is simulated on the display screen by a number of individually movable and continuously enlarging circular images arranged with the visible portions of smaller images being constrained within the window presented by the larger images. Depending upon the relative location of the circular images to one another and the portions displayed, they can adequately simulate twisting, turning travel through a cylindrical tube.

FIGS. 1A-1C are presented to illustrate this concept. In FIG. 1A, five generally circular images $C_1$-$C_5$ are presented on a display screen 10 in generally concentric fashion to simulate a view down a long tube. The display screen 10 is of the type that has formed thereon by an electron beam (not shown) traversing the display screen 10 from left to right and top to bottom forming 262 scan horizontal lines, each line containing 256 resolution elements (i.e., discrete positions of the electron beam) that are used to form images on the display 10.

As illustrated in FIGS. 1A-1C, the circular images $C_1$-$C_5$ increase in diameter with the passage of time, simulating to the viewer travel down the interior of a cylindrical tube. Thus, for example, the circle $C_1$ of FIG. 1A enlarges with time to appear in FIG. 1B as the image $C'_1$, which is in the process of disappearing (i.e., outgrowing) the video display 10. Similarly, the circles $C_2$-$C_5$ of FIG. 1A are shown as the enlarged circles $C'_2$-$C'_5$ in FIG. 1B, and a new circular image $C_6$ makes its appearance in FIG. 1B. Note, that only a portion of the circular object $C_6$ appears on the display 10 to represent a right turn of the tube. In FIG. 1C, the circular images $C'_2$-$C'_5$ (of FIG. 1B) and $C_6$ now appear to have again grown (with the passage of time) to become as the circular images $C''_2$-$C''_5$ and $C'_6$ respectively. FIG. 1C also illustrates another circular image $C_7$ as making its appearance on display 10 to continue the illusion of a right turn of the tube. Note that in FIG. 1C the circular image $C_1$ of FIG. 1A ($C'_1$ of FIG. 1B) has disappeared from the view presented by the display 10.

In actual practice of the invention, as embodied in the described video game, each circular image is provided with a color and luminance values that distinguish it from the images within its own periphery, as well as those that may circumscribe it. For example, referring to FIG. 1A, the area 12 that surrounds the circular image $C_1$ may be a light blue color. The annular area defined by the the peripheries of the circular images $C_1$ and $C_2$ could be a darker blue color, while the annular area defined by the peripheries of the circular images $C_2$ and $C_3$ could be a dark blue/red hue. Thereby, the peripheries the circular images are provided with a much more pronounced definition.

Referring now to FIG. 2A, a description of the parameters used to describe and form circular images—or any elliptical image—will be presented before discussing the circuitry used to implement the invention. FIG. 2A illustrates a portion 10' of the display screen 10 having formed thereon a circular image C defined by a circumferential boundary B. The boundary B is divided into left and right halves B1 and B2, respectively, by a vertical center line $C_L$. The horizontal position of the circle C on the video display screen 10' is defined by the horizontal distance of the vertical center line $C_L$ of the circular image C from the left edge 20 of the video display screen 10'. this distance is denoted in FIG. 2A as $H_c$.

The vertical location of the circular image C on the video display screen 10 is defined by the horizontal scan line, V-start ($V_s$), which initiates or starts the display of the circular object C. To put it another way: $V_s$ is the first horizontal scan line containing the first horizontal display element $V_o$.

Each horizontal display element of the circular image can be defined by the location of the left and right end points which respectively begin and end the "painting" of each horizontal display element by the scanning electron beam of the display. For example, the first horizontal element $V_o$ of the circular image C (FIG. 2A) is defined by the left and right end points $LEP_o$ and $REP_o$. Similarly, the horizontal element $V_1$ is defined by the end points $LEP_o$ and $REP_o$, horizontal element $V_i$ is defined by end points $LEP_i$ and $REP_i$, and so on.

Rather than store each end point information for each circular image to be displayed, in the practice of the present invention picture information describing a model M (FIG. 2B) of the desired image is stored. This picture information is then modified in a manner described below to obtain the display image of the desired size and shape.

The picture information of the model M comprises 256, eight-bit data words, each data word describing the right end point (REP) of each horizontal element V of the model M relative to the model's vertical center line $C_{1m}$, which is coincident with the vertical center line $C_{1d}$ of the display 10. As will be seen, the left end point (LEP) is obtained for each horizontal element V by taking the ones complement of the right end point.

The data words describe a distance from the center line $C_{1m}$ of the model M twice as long as needed. This is to allow generation of the plurality of circular images on the display 10 that enlarge with time to give the impression that they smoothly disappear from the display. Further, by using each of the end points of the model twice (i.e., forming two sequential horizontal elements V) the image generated (if capable of being displayed) would appear as shown in FIG. 2B—generally elliptical in shape and having a two-to-one axis ratio.

Using the picture information of the model image, circular images of any desired size are produced by the present invention by varying the horizontal and vertical eccentricities of the model. For example, horizontal eccentricity is varied by "scaling" (i.e., multiplying by a predetermined factor) each data word to obtain end point locations that are closer to the center line of the image. To put it another way, each horizontal element of the model image used is shortened.

Vertical eccentricity is varied by using selected data words, skipping others, to develop an image that has less horizontal elements than that indicative by the picture information of the model M, or by using data words defining single horizontal elements V) for two or more scan lines ($V_s$—FIG. 2A).

Since, in essence, the location of each horizontal element produced from the pictorial information of the model M is referenced to the center of the display screen 10, and the origin of any circular image produced from the pictorial information of the model M will lie on the vertical center line $C_{1d}$ of the display screen 10. Movement of the circular image displayed, however, is effected by offsetting the location end formation derived for each left and right end point of the circular image to be produced by the same amount.

To sum up briefly thus far, circular image generation is effected by using picture information of a model image to obtain data words describing the location (relative to the center line $C_{1d}$ of the display screen 10) of the end points (LEP and REP) of each horizontal element (V) forming the displayed circular image. Horizontal placement of the displayed image is effected by adding or subtracting a horizontal position data word to each left and right end point. Vertical displacement of the display image is effected by specifying which horizontal scan line ($V_s$) begins the display of the image. The size of the circular image is varied by appropriately scaling the end point data to modify horizontal eccentricity and by selective use of the available horizontal elements of the picture information of the model to modify vertical eccentricity. Thus, using the image model, a circular image can be generated merely by specifying, for each image to be produced, the following information:

1. A horizontal position in terms of the displacement of the displayed image from the vertical center line $C_{1m}$ of the display 10:H.
2. A vertical location by specifying the first scan line used to begin display of the image:$V_s$.
3. Vertical eccentricity:$E_v$.
4. Horizontal eccentricity (appropriately chosen with $E_v$ in mind in order to obtain a circular image):$E_h$.
5. Data describing the color and luminance of the displayed image.

Turning now to FIGS. 3A and 3B, there is illustrated the control circuitry used to effect generation of elliptical images in accordance with the present invention. As illustrated, overall control is effected by a microprocessor 22 which receives control signals on the player control inputs 24 from, for example, player control apparatus (not shown). Such control signals are indicative of the speed with which the images used to simulate a tube and travel therethrough grow, and their position on the display screen 10. The microprocessor 22 is connected to a program memory 26 which supplies instructions that provide for overall control of the logic circuits of FIGS. 3A-3B. In response to the signals received on the player control inputs 24, the microprocessor 22 will formulate the data necessary to specify the generation of video information for the images viewed on the video display 10.

Each circular image to be generated is specified by the five data word group described above. This data word group is formulated by the microprocessor 22. The $V_s$ data word for each circular image to be displayed is conducted on data bus 28 to, and stored in, a vertical start RAM 30 at memory locations corresponding to each particular circular image. During each horizontal retrace interval preceeding the active line scan, each memory location of the vertical start RAM 30 is accessed and compared by the compare circuit 32 to a line count number that specifies the horizontal line to be generated. If an equal is obtained from this comparison, and INITIATE signal is provided by the compare circuit 32.

The data words describing the size of the circular object, in terms of its vertical and horizontal eccentricity, $E_{v\ L\ and\ Eh}$, are respectively communicated on the data bus 28 to, and stored in, a vertical eccentricity RAM 34 and a horizontal eccentricity RAM 36.

An 8-bit data word specifying the horizontal location H of each circular image is communicated on the data bus 28 and stored in an H-position RAM 38 at memory locations corresponding to the circular image to be displayed. A 16-bit latch 34A and 8-bit latches 36A and 38A temporarily hold data that is accessed from the respective RAMS 34, 36 and 38 until used.

The data bus 28 also connects the microprocessor 22 to an address RAM 40. The first address of the first of the memory locations containing the picture information describing a image model is formulated by the microprocessor 22 and stored in the address RAM 40. The address RAM 40 includes an accumulator section 40A where, during each vertical retrace time, the first address is transferred and held at memory locations corresponding to each circular image to be displayed. As will be discussed below in greater detail, as each image is created on the display screen 10, this first address is updated each horizontal line scan to provide for accessing all of the necessary elements of the model image for the particular image being created and displayed. The picture information of the model image is stored in image PROM 42.

The output lines of the address RAM 40 are conducted to a 16-bit latch 41. In turn, the output lines of the 16-bit latch 41 are connected to one set of operand inputs of a (16-bit) binary adder 44. The second and remaining set of operand inputs of the adder 44 receive the output lines of the 16-bit latch 34A. During each horizontal retrace interval that any image is being displayed, the circular image PROM 42 address corresponding to the image being created is accessed from the accumulator section 40A of the address RAM 40 and temporarily stored in the 16-bit latch 41. The stored content of the 16-bit latch 41 is applied to a binary (16 bit) adder 44 and summed with the vertical eccentricity data word corresponding to the image being displayed. The sum is an updated image PROM 42 address and is returned via the multiplex (MPX) circuit 39 to the memory location in the accumulator section 40A which corresponds to the image being generated (i.e., that memory location from which the unmodified image PROM 42 address was obtained).

While the image PROM 42 is held in the 16-bit latch 41 the eight most significant bits thereof are applied to the address circuits of the image PROM. Depending on the particular data word describing the vertical eccentricity of the image to be displayed, the address applied to the image PROM 42 can be made to change every horizontal scan line of the display 10, or every multiple horizontal scan line of the display 10. Alternately, the 8 bit address applied to the image PROM 42 can change in larger steps to selectively access from the image PROM 42 selected ones of the end point data words. Thus, the magnitude of the vertical eccentricity data word determines the rate at which the circle PROM is addressed.

The information accessed from the image PROM 42 is applied to a 16bit multiplier circuit 46 where it is multiplied by the horizontal eccentricity data word contained in the 8-bit latch 36A. The 8 most significant bits of the 16-bit result are coupled from the multiplier circuit 46 to an EXCLUSIVE-OR Gate 48 which passes the result or its complement, depending upon the left/right (L/R) boundary signal. The output of the EXCLUSIVE-OR gate 48 conducts the result to an 8-bit adder 50 where it is combined with the horizontal position data work, H, temporarily stored in the 8-bit latch 38A. The information appearing on the output lines 52 of the 8 bit adder describe the horizontal position within the ith horizontal scan line displaying the circular image of either the left ($LEP_i$) or the right ($REP_i$) end point of a horizontal element ($V_i$) of the circular image. The right end point, REP, is obtained by applying the 8 most significant bit result of the multiplier circuit 46 to the adder 50 via the EXCLUSIVE-OR gate 48 with a ZERO state applied to the L/R signal line. Conversely, the left end point, LEB, is obtained on the signal line 52 when the L/R signal line is provided with a binary ONE (which, in effect, produces the one's complement of distance from the vertical center of the image to the end point).

The binary sum computed by the adder 50 (i.e., the horizontal position within the next horizontal line scan of the left or right end point LEP or REP) is conducted by the output line 52 to a priority logic circuit 60 and an (8-bit) counter 62 (FIG. 3B). During each horizontal retrace interval, the binary counter 62 is held in a continuous load state so that the counter appears transparent to the information conducted to the load (LD) inputs of the counter by the signal lines 52. Accordingly, the binary information is passed through the binary counter 62 and applied to the address circuits of the marker RAM 64. A 1-bit marker is caused to be read into the marker RAM 64 at a memory location addressed by the sum from adder 50 and corresponding to the horizontal position at which the marker (designating a left or right end point) will appear on the video display 10. The marker, a binary ONE, is stored in the marker RAM 64 when a LOAD signal, produced by the priority logic 60 and indicating that the sum produced by adder 50 is indicative of a displayed image end point, is supplied to marker RAM.

Eight-bit data words, each describing the color and luminance of a circular image, are conducted from the microprocessor 22 to a color/luminance RAM 68 by the data bus 28. Each data word is stored in the color/luminance RAM 68 at a memory location that corresponds to the particular circular image to be displayed. During each horizontal retrace interval, if it is determined that a horizontal element of a circular image is to appear in the upcoming line scan, the eight-bit color word associated therewith is transferred from the color/luminance RAM 68 to a Last-In-First-Out (LIFO) and First-In-First-Out (FIFO) RAMs 70 and 72, where it is stored in an ordered location explained more fully below.

The FIFO/LIFO control logic 74 also receives the LOA signal from the priority logic 60 to effect control of the storage operation. The FIFO/LIFO control logic 74 also controls the sequential reading of the FIFO and LIFO RAMs 70, 72, during each horizontal line scan. The information accessed from the FIFO and LIFO RAMs 70, 72 is applied to a left/right multiplex (L/R MPX) circuit 76 which selects the particular data output signal lines from the respective RAMs and conducts them to a color-luminance generator 80. Color-luminance generator 80 converts the information received to chroma and luminance information that is then applied to a video adder unit 82 and combined with COMPOSITE SYNC and other video signals.

Timing and control signals that govern information selection and transfer within the system of FIGS. 3A and 3B are generated by the sync generator 90 (FIG. 3A). The sync generator 90 receives a 12 MHz clock signal from a system clock 92 to drive horizontal and vertical synchronization counters (not shown) of conventional design to produce various timing and synchronizing pulses used throughout the system for loading various of the latches and counters as will be seen below. Thus, the sync generator 90 provides to the COMPOSITE SYNC signal that is combined with other video signals and communicated to display 10 for synchronizing purposes; a DMA ADDRESS signal that communicates to the various memory circuits to effect synchronous access of the information necessary for operation; and DMA TIMING signals, comprising various load pulses, to cause, for example, the latches 34a, 36a, 38a, and 41 to accept and temporarily hold information when appropriate from the respective RAMs 43, 36, 38 and 40 (FIG. 3A). The sync generator 90 also produces a clock (CK) signal that is supplied to the microprocessor 22 via the signal line 91. In turn, the CK signal is delayed approximately 90 nanoseconds by the microprocessor 22 and conducted on line 23 to MPX39 to thereby effect selection of data bus 28 or the output of adder 44 for communication to the address RAM 40.

Not shown in the block diagram system, for purposes of clarity of FIGS. 3A and 3B, are the address lines which connect the microprocessor 22 to the various memory circuits, or the address lines that conduct the DMA ADDRESS signals also thereto. These are elements which are well within the comprehension of those skilled in this art to add as necessary. Further, it should be appreciated that since both the microprocessor 22 and the sync generator 90 provide address signals that are communicated to the respective memory circuits such as, for example, the boundary address RAM 40, an appropriate multiplex circuit is necessary. However, such multiplex circuits are well within the skill of the art and are not presented here in order to more clearly present the invention itself, it being understood that access to the respective memory circuits (i.e. the vertical eccentricity RAM 34, horizontal eccentricity RAM 36, H-position RAM 38, boundary address RAM 40 and color/lum RAM 68) are all addressable by either the microprocessor 22 or by the DMA ADDRESS signal produced by the sync generator 90.

Referring now to FIG. 4, there is illustrated in greater detail, in block diagram form, the priority control logic 60. The priority control logic 60 is shown as including a left boundary (LB) latch 100, a right boundary (RB) latch 102, the data inputs of which are connected to the adder 50 (FIG. 3A) via the data output lines 52. The contents of the LB and RB latches 100, 102 are selectively conducted to first set of inputs of a digital compare circuit 104 by a multiplex (MPX) circuit 106. Applied to a second set of inputs of the digital compare circuit 104 are the data output lines 52. A signal line 105 communicates the results of the comparison to a priority timing circuit 108.

The priority control logic 60 functions to determine whether portions of any circular image are to be deleted from view. For example, with reference to FIG. 1B, in order to simulate a turn in the tube represented by the images $C_1$–$C_6$ note that the circular image $C_6$ is partially obscured by the right boundary of the image $C'_5$. Similarly, in FIG. 1C, both the circular images $C'_6$ and $C_7$ are partially obscured by the circular image $C''_5$. The priority control logic functions to compare respective end points of the circular images to determine what portion of an image is to be deleted from viewing, if any. This function will be described more fully below when the operation of the invention is described.

Illustrated in greater detail in FIG. 5 is the control logic 74 for effecting the color information transfers to and from the LIFO and FIFO RAMS 70 and 72. A timing circuit 112 receives DMA TIMING signals from the sync generator 90 to control a binary counter 114 and a binary up/down counter 116. These counters are incremented each time a marker bit is written to the marker RAM 64; if no marker is written, one or the other counter is not incremented. These counters develop the address signals used to respectively address the FIFO and LIFO RAMS 70 and 72 and indirectly monitor the number of 8-bit color/luminance data words written to the FIFO and LIFO RAMs 70, 72.

At the end of each horizontal retrace interval, the contents of the binary counter 114 is transferred to and temporarily stored in the latch 118 and binary counter cleared. As the marker bit for each left end point is displayed during active scan of the horizontal line, the binary counter 114 is again incremented and then compared to the count contained in the latch 118 by the compare circuit 120. When a compare is obtained, indicating that the marker bits for all left end points have been displayed during the active line scan, the compare circuit 120 signals the timing circuit 112 via the pulse on the signal line 122, at which time the timing circuit 112 switches the L/R MPX circuit 76 (FIG. 3B) to look at the data output lines of the LIFO RAM 72. As each data word is read now from the LIFO RAM 72, the binary up/down counter 116 is decremented. By this mode of addressing the FIFO and LIFO RAMs 70, 72, a First-In-First-Out and Last-In-First-Out memory organization is achieved.

Referring now to FIGS. 3A, 3B and 4-6, the operation of the invention will now be described. FIG. 6 is a portion 10" of the display screen 10 of FIG. 1B, illustrating in greater detail the circular images $C'_4$, $C'_5$ and $C_6$. FIG. 6 adds color/luminance values for the following discussion. The circular image $C'_3$ of FIG. 1B, shown in FIG. 6 as background only, and is assumed to hve a gray color/luminance value superimposed on this gray background provided by the circular image $C'_3$ are the circular images $C'_4$, $C'_5$ and $C_6$, each respectively superimposed on the larger and each having color/luminance values of blue, red and green as indicated on the figure.

For each circular image appearing on the display 10, the microprocessor 22 formulates the necessary data words specifying each image, to wit: position (in terms of vertical start ($V_s$) and horizontal location (H)), size (in terms of vertical and horizontal eccentricities $E_v$ and $E_h$), the desired color/luminance for the image, and the address of the first data word element of the models stored in the image PROM 42. The data words are transferred by the microprocessor 22 to the appropriate memory circuits (i.e., RAMs 30, 34, 36, 38, 40 and 46— FIGS. 3A and 3B) at memory locations corresponding to each circular image.

Each horizontal retrace interval is divided into a number of time slots by the timing signals produced by sync generator 90. Each time slot is allocated to a circular image to be presented on the display 10. The time slots are sequentially alloted according to the relative sizes of the circular images to which they correspond, beginning with the time slot corresponding to the largest circular image to be displayed and descending from there. Thus, during each time slot, the vertical start value of the corresponding image is accessed from the vertical start RAM 30 and compared with the LINE COUNT signal (identifying the number of the next active line scan) by the compare circuit 32. If the $V_s$ value is less than the LINE COUNT value, nothing further will occur during the time slot. If, however, the $V_s$ value is greater than that of the LINE COUNT signal, the INITIATE signal from the compare circuit 32 is made active. This signifies that elements of the circular image are to appear in the upcoming active line scan and signals the sync generator 90 to generate the necessary timing and control signals.

At the outset of each horizontal retrace interval, for purposes that will become evident below, the LB and RB latches 100 and 102 (FIG. 4) are loaded with binary values that respectively indicate the left and right edges or boundaries 10A and 10B of the display 10 (FIG. 1A).

Assume that the time slot allocated to the circular image $C'_4$ has been reached during the horizontal retrace interval immediately preceding the scan line $V'_i$ (FIG. 6). The $V_s$ quantity is accessed, compared to the LINE COUNT signal and found to be larger, causing an INITIATE signal to be applied to the sync generator 90 which, in turn, commences generation of timing signals to effect the following operations: The address of the model image is transferred from the accumulator section 40A of the address RAM 40 to the 16-bit latch 41. At the same time, the vertical eccentricity, horizontal eccentricity, and horizontal positions corresponding to the image $C'_4$ are transferred from RAMs 34, 36 and 38 to latches 34A, 36A and 38A, respectively. The contents of the 16-bit latches 34A and 41 are summed by the adder 44 and the result returned to the memory location of the accumulator section 40A corresponding to the image $C'_4$ as the image PROM 42 address to be used in the next horizontal retrace interval.

The eight most significant bits contained in the 16-bit latch 41 are applied to the address circuits (not shown) of the image PROM 42 to access the data word defining an end point distance of the model. The model data word is communicated from the image PROM 42 and applied to the multiplier circuit 46 where it is scaled by the $E_h$ value, held in latch 36A. The eight most significant bits of the result, signifying the horizontal distance from a vertical centerline of the image $C'_4$ to an end point 110 or 112 (FIG. 6), are applied to the EXCLUSIVE-OR circuit 48. The signal on the L/R signal line is held momentarily in a ZERO state by the sync generator 90, allowing the true value of the multiplier result to be passed to the outer circuit 50. This result is then summed with the horizontal position data word corresponding to the image $C'_4$ (presently held in the 8-bit latch 38A) to produce on the signal line 52 a signal indicative of the location within the scan line $V'_i$ of the end point 110.

The sum produced by the adder 50 is applied to the address circuits of the marker RAM 64 (FIG. 3B) via the binary counter 62 (which is held in a continuous load state during the horizontal retrace interval). At the same time, this sum is also applied to the LB and RB latches 100 and 102 and to the compare circuit 104 of the priority control logic 60 (FIGS. 3B and 4). The sum is compared to the content of the RB latch 102, the latter value being selected and conducted to the compare circuit 104 via the MPX circuit 106. If the compare indicates that the sum conducted on the signal line 52 is less than the content of the RB latch 102, indicating that the location on the display screen 10 of the end point 130 is not to the right of the screen boundary 10A (and therefore undisplayable) or to the right of the right end point of a larger circular image (and, therefore, hidden), an indication thereof is conducted to the priority timing circuit 108 by signal line 105. In turn, the priority timing circuit issues a LOAD signal which is combined with DMA TIMING at AND gate 66 (FIG. 3B) to store a marker bit in the RAM 64 at a memory location designated by the sum appearing on signal line 52; the location at which the marker bit is stored also corresponds to the horizontal location within the scan line $V'_i$ at which end point 130 will appear.

Concurrent with the generation of the LOAD signal, the priority timing circuit 108 also issues a pulse on the signal line 103 that is applied to the RB latch 102, causing it to receive and store the sum presently appearing on the signal lines 52. Thus, the location of the right end point 130 of the image $C'_4$ becomes the right boundary of a window within which any other images are to be displayed. Any subsequent compares by the priority control logic 60 of right end points of smaller images found to be located to the right of the end point 130 will result in inhibiting any marker bit being loaded in the marker RAM 64 corresponding to the end point of that image.

The load signal produced by the priority logic 60 is coupled to the FIFO/LIFO control logic 74 to increment the binary up/down counter 116. The timing circuit 112 of the FIFO/LIFO control logic 74 then effects transfer of the 8-bit data word indicative of the color and luminance information of the image $C'_4$ from the color/luminance RAM 66 to the LIFO RAM 72, where the data word is stored at the addres designated by the binary up/down counter 116 (FIG. 5).

For the left end point 132 of the image $C'_4$, the eight most significant bits of the multiplier result from the multiplier 46 are complemented at the EXCLUSIVE-OR gate 48 by a binary ONE being applied to the L/R signal line by the sync generator 90. The complemented result is applied to the adder circuit 50, where in effect, it is summed with the horizontal location word corresponding to the image $C'_4$. The effect of the summation now, however, is to perform a ones-complement subtraction of the multiplier result from the content of the 8-bit latch 38 to obtain the horizontal location within the scan line $V'_i$ of the left end point 132 of the image $C'_4$. Thus, the signals indicative of the location of the left end point 132, are now carried by the signal lines 52 and used as an address for the marker RAM 64 to store a marker bit, as described above, with one difference: The sum is now compared to the content of the LB latch 100 and only if found greater is the storage of the marker bit effected and the sum then all stored in the LB latch 100, becoming the new left boundary for any subsequent comparison.

Concurrent with the operation of storing a marker bit indicative of the left end point 132, the binary counter 114 is incremented and the color/luminance data word describing the color and luminance value desired for the circular image $C'_4$ is again read from the color/luminance RAM 6B and this time written into the FIFO RAM 70 at a memory location designated by the binary counter 114. This completes the information storage and set up for displaying the circular image $C'_4$ for the upcoming end line $V'_i$.

The above-described operations, which take place during the time slot of the horizontal retrace interval allocated to the circular image $C'_4$ is immediately followed by the time slot allocated to the next smaller image to be displayed, i.e., the image $C'_5$. Information transfers proceed in the same manner with marker bits indicative of the right and left end points 134 and 136 being stored in the marker RAM 64 at locations specified by the sum formed by the adder 50 and corresponding to the location on the display 10 at which the end points will appear. The color/luminance data word specifying the color and luminance of the image $C'_5$ itself is transferred from the color/luminance RAM 68 and stored in the LIFO RAM 72 and FIFO RAM 70 (for end point 116), and counters 114 and 116 incremented accordingly.

The information set up for the circular image $C_6$ is treated somewhat different. Note that the position of the circular image $C_6$ within the next larger image $C'_5$ is such that a portion 133 (indicated in phantom) is hidden from view to simulate a turn in the tube represented by the cumulative presentation of all images. Thus, the right hand end point 138 in scan line $V'_i$ of the image $C_6$ must be suppressed. This is accomplished in the following manner: During the time slot corresponding to the image of $C_6$, the sum from the adder 50, designating the horizontal location of the right end point 138, is applied to the compare circuit 104 of the priority control logic 60 (FIG. 4) and compared with the contents of the RB latch 102. The RB latch now, however, holds the horizontal location of the end point 134 for the circular image $C'_5$, which was stored therein during the time slot allocated to the image $C'_5$. Since the end point 138 is to the right of the end point 134, the signal line from the compare circuit 104 will convey an indication thereof to the priority timing circuit 108. The priority timing circuit 108, however, is looking for a "less than" indication, since this is a right end point computation. Accordingly, no LOAD signal is generated, no pulse is applied to the signal line 103 to load the sum on the signal lines 52 into the RB latch 102 (as would normally be done) and the binary up/down counter 116 is not incremented. The color and luminance data word is still, however, transferred from color/luminance RAM 68 to the LIFO RAM 72, and written into the memory location that held the data word corresponding to the circular image $C'_5$, for purposes that will become evident below.

The information associated with the left end point 140 of the image $C_6$ is set up in the normal fashion, as described above with respect to the left end points of the larger images.

Since no more circular images to be displayed, nothing more happens until the end of the present horizontal retrace interval. At the end of the retrace interval, just before commencing the active line scan $V'_i$, the content of the binary counter 114 is transferred to and stored in the latch 118 of the FIFO/LIFO control logic 74 (FIG. 5) and the counter cleared. The binary up/down counter 116 is left unchanged.

At the initiation of the active line scan $V'_i$, at least a portion of 70A (FIG. 7A) of the FIFO RAM 70 contains the sequentially ordered arrangement of the data words 150-153, describing the color and luminance values of gray, blue, red, and green, respectively. Similarly, a portion 72A (FIG. 7B) of the LIFO RAM 72 will contain the order arrangement of data words 154-156, describing color and luminance values of green, blue, and grey, respectively. The values of the data words specify the particlar color/luminance values necessary to display the circular images as illustrated in FIG. 6.

The binary counter 114, having previously been cleared, now contains a count that specifies an address of the FIFO RAM 70. As the active scan of the horizontal line progresses and each stored marker bit is read from the marker RAM 64 in synchronism with the scanning beam, the binary counter 114 will be incremented to sequentially access the color/luminance data word, including the data words 150-153, stored for each circular image to be displayed; the first data words stores will be the first accessed. The content of the LIFO RAM 72 will be accessed beginning with the last data word 154 stored and sequentially accessing the data words stored immediately preceeding the data word 154 (i.e., data words 155 and 156).

As the image-forming beam scans display 10 (and display portion 10" of FIG. 6) along the line scan $V'_i$, binary counter 62 (which has been cleared at the initiation of the scan V), is provided clock signals by the sync generator 90 (FIGS. 3A, 3B) to cause the counter to count in synchronism with the beam's scan. Accordingly, the binary counter 62 forms address signals that are applied to the marker RAM 64 for sequentially reading the stored marker bits. As the marker RAM 64 is read, and as each marker bit is accessed, a pulse train 158 (FIG. 6) is formed on the output line 65 of the marker RAM 64, each of the pulses indicative of an end point of an image displayed during the line scan $V'_i$. The pulse train is applied by the output line 65 to the timing circuit 112 of the FIFO/LIFO control logic 74 (FIGS. 3B and 5). Thus, for example, at time $T_1$ of the line scan, the marker bit corresponding to the left end point 132 of the circular image $D'_4$ will be encountered and the pulse 160 will be generated on the output line 65.

The received pulses conducted on the output line 65 cause the timing circuit 112 of the FIFO/LIFO control logic to issue an increment signal to the binary counter 114 and READ signals on the R/W signal line to the FIFO RAM 70, accessing (for the pulse 160) the data word 151 (FIG. 7A) associated with the end point 132 and specifing a color and luminance value of blue. Data word 151 is communicated to the color/luminance generator via the L/R MPX 76 where it is latched (until receipt of a new data word) and converted to a color/luminance value acceptable by the display 10. The converted value is summed with the video information and composite sync by the vido summing network 82; from there it is communicated to display 10.

At times $T_2$ and $T_3$, the marker bits corresponding to the left end points 136 and 140 of the images C and $C'_5$ and $C_6$ respectfully, are encountered in the marker RAM 64, producing the pulses 162 and 164 on the output line 65. In turn, the binary counter 114 is incremented with each pulse received by the timing circuit 112 to sequentially address the LIFO RAM 70 and access data words 152 and 153.

Once the marker bit corresponding to the left end point 140 is reached, the last of the left end points the count contained in the binary counter 114 equals the value stored in the latch 118. Accordingly, the compare circuit 120, which continuously compares both values, issues an EQUAL signal that is conducted on signal line 122 to the timing circuit 112. This causes the timing circuit to switch selection of the DATA OUT lines of the LIFO RAM 70 by the L/R MPX 76 to the DATA OUT lines ot the LIFO RAM 72.

At the same time, the memory location of the FIFO RAM 72 is read and the accessed data word communicated to the color/luminance generator 80, where it is latched. It will be remembered that at the end of the horizontal retrace interval, the binary up/down counter 116 held the last count, designating the memory address containing the data word 154 (i.e., a green color and luminance value) for the image $C_6$.

The image forming beam of the display continues along scan lines $V'_i$, painting a green horizonal element of image $C_6$ extending from the end point 140 until the marker bits corresponding to the right end point 134 of image $C'_5$ is encountered in the marker RAM 64. At that time, the pulse 166 is conducted on the output line 65 to the timing circuit 112 to cause the binary up/down counter 116 to decremented to access the data word 154 from the LIFO RAM 72. The data word 154 is conducted to and latched into the color/luminance 80 and converted accordingly. When the marker bit corresponding to the end point 130 is encountered (generating the pulse 168 at time $T_5$), binary up/down counter is again decremented, the data word 155 read from the LIFO RAM 72, and applied to the color/luminance generator 80.

When the scan line $V'_i$ ends, another horizontal retrace interval is entered and the entire process described above continues. When the entire scan of the display is finished, and during the vertical retrace interval, the microprocessor 22 updates the information corresponding to each displayed image, as necessary to increase its size (by modifying the vertical and horizontal eccentricity values, $E_v$ and $E_h$) and changing its position (by modifying the $V_s$ and H). In addition, the microprocessor refreshes the image PROM address stored for each image in accumulator section 40A of the address RAM 40 by transferring a new start address from another section of the RAM 40 to the appropriate locations of the accumulator section.

The operation of the present invention described above, and the illustrations provided by the figures (i.e., FIGS. 1B, 1C, and 6), have shown the generation of circular images used to stimulate a right turn in a tube by having a larger circular image (i.e., image $C'_5$-FIG. 6) obscure at least a portion of the next smaller circular image contained therein (i.e., $C_6$). Left turns are simulated essentially in the same manner. In the case of left turn simulation, however, it is the left end point of one or more circular images that are suppressed. Accordingly, when the horizontal location of a left end point is developed at the output of the adder 50, it is conducted on signal line 52 to the compare circuit 104 of priority logic 60 and compared with the content of the LB latch 100, as described above. If the compare finds that the value of the data conducted on the signal line 52 is greater than that of the content of the LB latch 100 (indicating that the location of the left end point presently calculated is to the right of that described by the contents of the LB latch 100), operation proceeds as described above with respect to the left end point 132, 136 and 140 (FIG. 6).

If, however, it is found that the value of the data presented to the compare circuit 104 is less than that of the LB latch 100, indicating that the developed horizontal location is to the left of that described by the content of the LB latch, no marker bit is stored in the marker RAM 64 and the binary counter 114 is not incremented; the data word describing color and luminance information for the image corresponding to the present time slot is read from the color/luminance RAM 68 and written into the LIFO RAM 70 at the memory location containing the data word describing color and luminance information of the image corresponding to the immediately preceeding time slot. In this manner, a circular image that is displayed on the display screen 10 as being contained within a larger circular image is viewed as having at least a portion of its area obscured by the left of the larger image.

I claim:

1. Apparatus for forming a movable elliptical image on a video display screen of the type having a scanning electron beam forming a plurality of horizontal scan lines in response to timing signals including vertical and horizontal retrace intervals, said image being variable in eccentricity, the apparatus comprising:
    first memory means for containing binary data indicative of a plurality of horizontal elements of a model image;
    second memory means for storing a data word group descriptive of at least the eccentricity and display screen location of said elliptical image;
    first combining means coupled to said second memory means and resposive to at least a portion of said data word group for forming first address signals and for applying said address signals to said first memory means to access therefrom said binary data indicative of selected ones of said horizontal elements of said model image for each horizontal scan line used to form said elliptical image;
    second combining means coupled to said first and second memory means and responsive to a remaining portion of said data word group and said accessed binary data to form therefrom second address signals indicative of the location of said horizontal elements on said display screen;
    random access memory means coupled to said second combining means and responsive to said second address signals for storing marker information at memory locations corresponding to positions on the display screen; and
    means accessing said random access memory means in synchronism with said scanning electron beam.

2. Apparatus for forming a movable elliptical image on a video display of the type having an image-forming beam for forming a plurality of horizontal lines in response to timing signals, including horizontal retrace intervals, said elliptical image being variable in eccentricity and formed from a number of horizontal display elements, the apparatus comprising:
    first memory means for containing binary data indicative of a model image;
    second memory means for storing a data word group indicative of said eccentricity of said elliptical image;
    accessing means coupled to said first and second memory means and responsive to a first portion of said data word group for sequentially forming and applying first address signals to said first memory means to read therefrom said binary data;
    combining means coupled to said first and second memory means for combining a second portion of said data word with said accessed binary data to form therefrom second address signals indicative of said elliptical image horizontal display elements;
    random access memory means responsive to said second address signals for storing marker information for each horizontal display element at memory locations corresponding to locations on said video display; and
    means for sequentially reading said random access memory means in synchronism with said image-forming beam to obtain said marker information, and for forming therefrom video signals indicative of said elliptical image.

3. The apparatus of claim 2, said first portion of said data word group including a memory address word and a vertical eccentricity word, said accessing means including means for adding said first memory address word and said vertical eccentricity word to form first address signals.

4. The apparatus of claim 2, said first portion of said data word group including memory address word and a vertical eccentricity word, said eccessing means including means for producing a number of sequential accumulations from said memory address word and said vertical eccentricity word, said first address signals being formed from a portion of each of said accumulations.

5. The apparatus of claim 2, the second portion of said data word including a horizontal eccentricity data word, the combining means including means for multiplying said accessed binary data by said horizontal eccentricity word to produce a result from which is formed said second signals.

6. The apparatus of claim 5, the second portion of said data word group including a position data word indicative of the relative location of said elliptical image on said display screen, said combining means including means for summing said position data word and said result to form said second signals.

7. Apparatus for forming a plurality of elliptical images on a video display screen of the type having an image-forming beam for forming a plurality of horizontal scan lines in response to timing signals, including horizontal retrace intervals, said elliptical images each being variable in size and formed from a number of horizontal display elements, the apparatus comprising:
first memory means for containing a model image in the form of binary information indicative of a plurality of predetermined horizontal display elements;
second memory means for storing for each elliptical image data indicative of said size;
first accessing means responsive to a first portion of said data for each elliptical image for forming first address signals during each horizontal retrace interval and for applying said first address signals to said first memory means to read therefrom binary information indicative of one of said predetermined horizontal display elements;
combining means for receiving and combining said accessed binary information with a second portion of said data to produce therefrom second address signals;
random access memory means responsive to said second address signals for storing marker information indicative of the horizontal display elements at memory locations corresponding to positions at which the horizontal display elements are to be displayed; and
second accessing means for sequentially accessing said random access memory means in synchronism with said image-forming beam.

8. The apparatus of claim 7, wherein said elliptical images are individually positionable on said video display screen.

9. The apparatus of claim 8, said plurality of elliptical images being arranged to simulate a twisting, turning tunnel, each larger elliptical image forming a window containing smaller elliptical images, said random access memory means including priority-determining means for inhibiting marker information being stored for elliptical images or portions thereof outside said window presented by larger elliptical images.

10. The apparatus of claim 7, said data word group including color information, and including means responsive to said second accessing means for accessing said color information in synchronism with said image-forming beam.

11. Apparatus for generating video signals used for displaying an elliptical image that is variable in size, shape and position on a video display screen comprising:
first means for storing information indicative of a model image of predetermined size and shape;
second means for storing data indicative of the size, shape, and display screen location of the elliptical image;
third means for accessing said first and second means and for combining said predetermined model image information and said data to provide binary signals indicative of the location on the display screen of a plurality of display points indicative of the periphery of said elliptical image;
random access memory means responsive to said binary signals for storing markers at location corresponding to positions on said display screen of said periphery; and
means for sequentially reading said markers from said random access memory means and for forming therefrom said video signals.

12. A method for generating an elliptical image on a video display screen of the type having an image forming beam scanning said display to form a plurality of horizontal lines, said elliptical image being variable in eccentricity and formed from a number of horizontal display elements, the method comprising the steps of:
storing binary data indicative of a model image;
storing a data word group indicative of said eccentricity of said elliptical image;
accessing said data word group and utilizing a first portion thereof to form a number of first address signals;
sequentially using said first address signals to access said binary data;
combining said accessed binary data with a second portion of said data word group to provide second address signals indicative of said elliptical image horizontal display elements;
storing marker information for each horizontal display element at memory locations designated by said second address signals and corresponding to locations on said video display screen; and
sequentially reading said random access memory means in synchronism with said image forming beam to obtain said marker information and for forming therefrom video signals indicative of said elliptical image.

* * * * *